C. C. LAMB.
EGG BOILER.
APPLICATION FILED MAR. 29, 1918.

1,377,984.

Patented May 10, 1921.
3 SHEETS—SHEET 1.

Witnesses:
Inventor
Charles C. Lamb
by Eugene E. Warn Atty.

C. C. LAMB.
EGG BOILER.
APPLICATION FILED MAR. 29, 1918.
1,377,984.
Patented May 10, 1921.
3 SHEETS—SHEET 2.
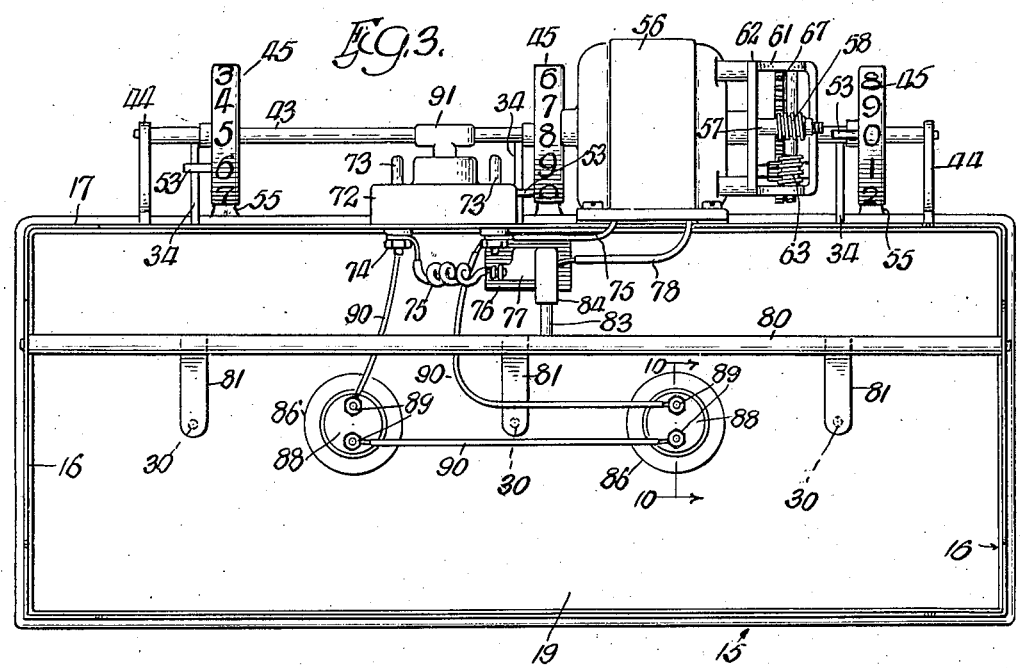
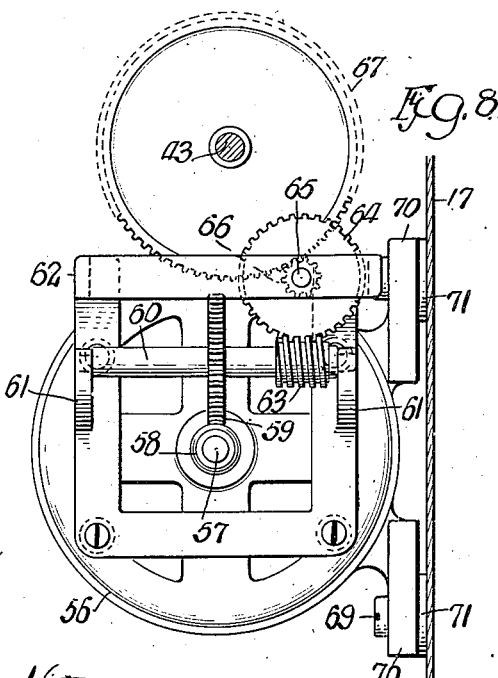
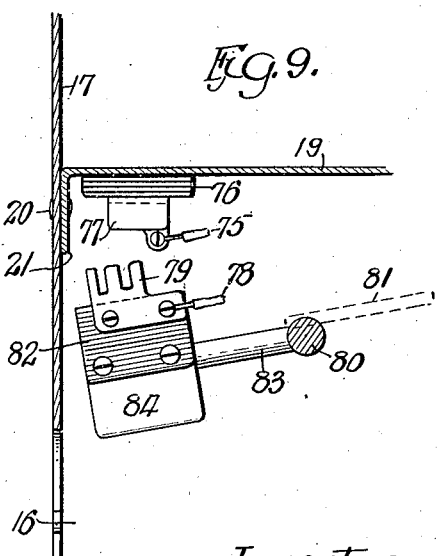
Witnesses:
Inventor
Charles C. Lamb C. C. LAMB.
EGG BOILER.
APPLICATION FILED MAR. 29, 1918.
1,377,984.
Patented May 10, 1921.
3 SHEETS—SHEET 3.
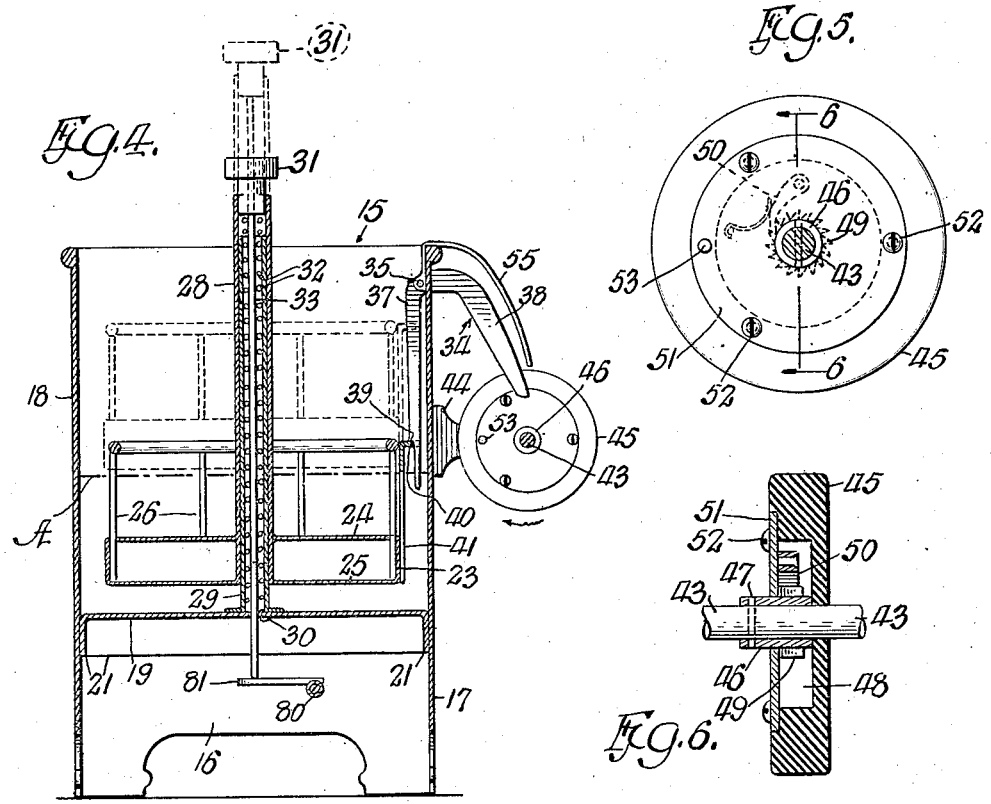
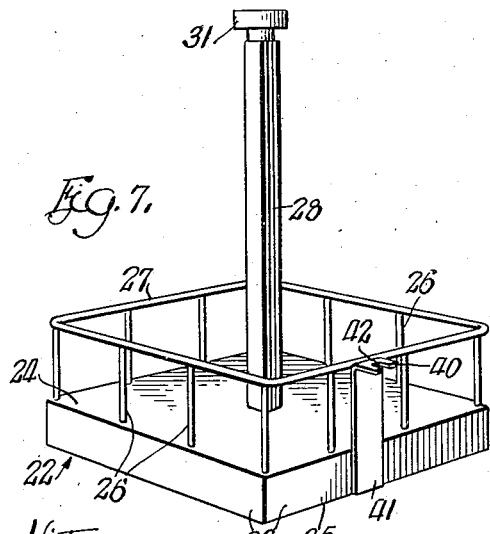
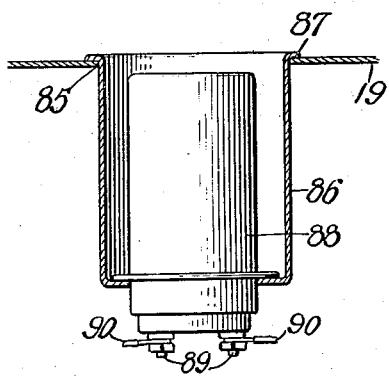
Inventor
Charles C. Lamb

UNITED STATES PATENT OFFICE.

CHARLES C. LAMB, OF CHICAGO, ILLINOIS.

EGG-BOILER.

1,377,984.

Specification of Letters Patent.  Patented May 10, 1921.

Application filed March 29, 1918. Serial No. 225,479.

*To all whom it may concern:*

Be it known that I, CHARLES CALVERT LAMB, a citizen of the United States, residing at Chicago, in the county of Cook and State of Illinois, have invented new and useful Improvements in Egg-Boilers, of which the following is a specification.

This invention relates to automatic egg boilers, that is, egg boilers of the type wherein the eggs are automatically withdrawn from the boiling water in the tank at the expiration of the period of time previously set for boiling such eggs.

Among the objects of my invention is to improve the construction of egg boilers of the kind referred to in the several particulars as will hereinafter more fully appear, and to provide, in particular, an egg boiler wherein the egg-holding receptacle or basket is raised out of the water in the tank by the combination of a spring and a float.

Another object of my invention is to provide means whereby the prime-mover or motor employed for operating the tripping mechanism will be set in operation upon the depression of the basket in the tank, and be stopped upon the lifting of said basket after the period of time required for cooking the eggs in such basket has expired.

A further object of my invention is to provide an egg boiler having a plurality of egg-holding receptacles or baskets and to so construct and arrange the prime-mover and the starting and stopping mechanism therefor that the prime-mover will remain in operation as long as any one of the plurality of baskets is held depressed in the tank.

A still further object of my invention is to operate the releasing mechanism by means of an electric motor, and, further, to provide a novel type of releasing or trigger mechanism interposed between the motor and the basket.

The invention consists further in the matters hereinafter described and more particularly pointed out in the appended claims.

In the accompanying drawings—

Fig. 3 is a bottom plan view of said device;

Fig. 4 is a vertical sectional view taken on line 4—4 of Fig. 1;

Fig. 5 is an enlarged view of one of the trip-pin carrying disks and showing the pawl and ratchet mechanism located within the same;

Fig. 6 is a diametrical sectional view taken on line 6—6 of Fig. 5;

Fig. 7 is a perspective view of one of the egg-holding baskets or receptacles;

Fig. 8 is an enlarged sectional view with parts in elevation and being taken on line 8—8 of Fig. 1;

Fig. 9 is an enlarged view showing the knife or like switch of the cut out mechanism, to be hereinafter described; and Fig. 10 is an enlarged vertical sectional view taken on line 10—10 of Fig. 3.

Figure 1:
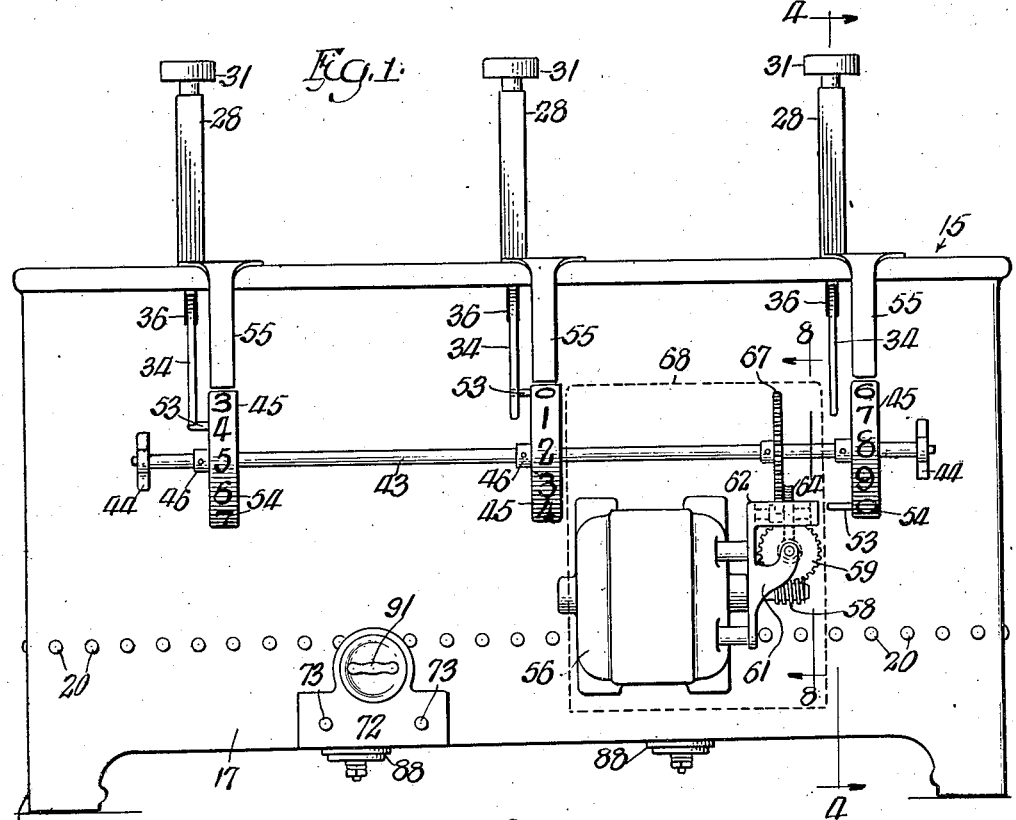
Figure 1 is a front elevational view of an egg boiler constructed in accordance with my invention.

As shown in the drawings, an egg boiler embracing the features of my invention comprises an upwardly opening tank 15 having upright end walls 16, 16, upright side or front and rear walls 17, 18, respectively, and a bottom wall 19, the latter in the instance illustrated being secured to the upright marginal walls of the tank above the lower edges thereof by a plurality of rivets or other fastening members 20, 20 inserted through the upright walls of the tank and a depending marginal flange 21 provided for that purpose on said bottom wall, as shown in Figs. 4 and 9. The upright marginal walls of the tank continue downward the same distance below said bottom wall and form supports for the device. As shown, the tank 15 is made rectangular in shape, when looking down on the top of the same, and located in the tank are a plurality of egg-holding receptacles or baskets 22, 22, arranged side by side and adapted for vertical movement in said tank so as to be lowered into and raised out of the boiling water therein. All the baskets 22 employed are made exactly alike. As illustrated in the drawings, the tank 15 is made long enough to accommodate three of said baskets 22. The bottom wall of each basket 22 is made in the form of a hollow float, comprising connected upright marginal walls 23 and spaced apart top and bottom walls 24, 25. (See Figs. 4 and 7.) The float thus formed is large enough to lift the weight of the basket, and the reason for providing each basket with a float will be hereinafter explained. The side walls of the basket are formed by a plurality of wire rods 26, 26, all projecting above the top wall 24 of the float the same distance and having their upper ends connected by a wire rod 27 forming the upper edge or rim of the basket. Each basket 22 is made of such a size as to easily hold six eggs, which when placed in the basket rest on the upper wall 24 of the float. The wire rods 26 are secured to the bottom wall of the basket in any desired manner.

Extending through the center of each basket is a hollow tube 28, the latter projecting above the basket and having its lower end extending clear through the float and being suitably secured to the top and bottom walls thereof. Said tube 28 is of such length as to extend above the upper edge of the tank when the basket is depressed to the fullest extent therein. Said tube 28 opens downward through said float. By extending the tube through both the upper and lower walls of the float, no water is permitted to enter the space within the walls of the float. Said tube 28 fits over and slides on an inner tube 29 (Fig. 4) open at both ends and being connected with that portion of the bottom wall 19 of the tank directly below the bottom of the basket 22. Said inner tube 29 may be connected with the bottom wall of the tank in any desired manner, and said bottom wall 19 is provided with a hole or aperture 30 extending therethrough and opening upward into said inner tube. Said inner tube 29 extends upward from the bottom wall of the tank to a point slightly above the upper edge thereof. Said inner and outer tubes 28, 29 are preferably made square or polygonal in cross-section, so as to hold the basket from rotation. The outer tube 28 is made of such length as to extend above the upper end of the inner tube 29 even when the basket is depressed to its fullest extent in the tank, and secured to the upper end of said outer tube is a knob 31 adapted to be grasped by the operator or waiter in depressing or lowering the basket into the tank. Said knob is preferably made of wood, fiber, or like material, so as to remain relatively cool at all times and thereby prevent burning the fingers of the hand of the operator when grasping the same.

For raising each basket or egg-holding receptacle 22 out of the water in the tank and maintaining the same in such position when not in use, I provide for each basket a helical spring 32 located in the inner tube 29 and bearing downward at its lower end against the bottom wall 19 of the tank and bearing upward at its upper end against the under side of the knob 31. Said spring 32 always tends to expand and maintain the basket 22 above the level of the water in the tank, as shown in full lines in Fig. 1 and in dotted lines in Fig. 4, wherein the normal level of the water in the tank is indicated by the dot and dash line A. To depress the basket into the water in the tank, the waiter or operator pushes down on the knob 31, thereby forcing the outer tube 28 and connected basket downward and compressing the spring 32 within the said tubes. To prevent the spring from buckling while being depressed, I secure to the knob 31 a downwardly extending rod 33, which as shown extends downward through the spring. Said rod 33 also forms part of the cut out mechanism, to be presently described.

For holding each basket in its lowered position in the tank, so that the eggs contained therein will be submerged in the boiling water in the tank and thus be cooked the required time, I provide a trigger mechanism of the following construction. For each basket 22 I provide a releasing member or trigger 34, the latter being made in the shape shown in Fig. 4. Said trigger 34 is mounted on the front wall 17 of the tank, adjacent its upper edge, on a horizontally disposed pivot pin 35. In the form shown, said trigger is made from one piece of metal and straddles the front wall 17 by extending through a vertical slot 36 provided on said front wall for that purpose. Said trigger comprises two connected arms, the inner one 37 extending vertically downward into the tank along the inside of the front wall 17 and the outer arm 38 extending outward and obliquely downward from said front wall 17. Said inner arm 37 is provided adjacent its lower end with a downwardly facing locking shoulder 39 adapted to engage above a lug 40 secured to the basket and projecting outward therefrom. Said lug 40 is preferably formed by bending outward the upper end of a metal strip or plate 41 secured to the wall of the basket facing the inner surface of the front wall 17 of the tank, as shown in Figs. 4 and 7. Said lug 40 is provided with a vertical slot 42 adapted to receive the inner arm 37 of the trigger, the side walls of said slot serving to prevent trigger from moving laterally out of contact with said lug in the raising and lowering of said basket. When the basket is depressed to its fullest extent in the tank, the lug 40 is below the locking shoulder 39, and the spring 32 holds such parts in locking engagement. When such parts are engaged, the inner arm 37 of the trigger holds the basket depressed in the tank. The outer arm 38 of the trigger is heavier than the inner arm thereof, so that when the basket is raised, as shown by dotted lines in Fig. 4, the weight of the outer arm will swing the inner arm inward from the front wall of the tank, thereby holding said inner arm always in a position to be engaged by the basket and be swung toward the front wall when the basket is depressed.

In order to release the inner arm 37 from the lug 40 and thereby permit the spring 32 to raise the basket above the water in the tank, I provide the following construction. Located in front of the front wall 17 and below its upper edge is a horizontally arranged shaft 43 having its ends journaled in suitable supporting brackets 44, 44 secured to said front wall 17 and projecting outward therefrom. In the instance shown said shaft 43 is shorter than the length of the tank, and neither end of said shaft projects beyond the end walls of the tank, thereby preventing the latter from occupying any more space lengthwise than the length of the tank. This is an essential feature, especially when my improved egg boiler is used in the kitchens of dining cars, as space therein is at a premium. Mounted on said shaft 43 are a plurality of trip carrying members preferably in the form of annular disks 45, 45, there being one of said disks for each basket 22. In the drawings I have shown the tank provided with three baskets, and it follows that there are three of said disks 45. Each disk 45 is preferably made of wood, fiber, or other non-heat-conducting material, so that said disks will always remain cool and thereby not burn the fingers of the operator or waiter when turning said disks for setting the same. Each disk 45 is connected with the shaft 43 by a suitable mechanism which will cause the disk to be rotated with the shaft but permit the disk to be turned manually about the shaft in the same direction as the shaft rotates but at a faster rate of speed for setting the disk and without retarding or otherwise interfering with or stopping the rotation of said shaft. In the instance shown I have provided a pawl and ratchet device for such purpose, and, as illustrated in Figs. 5 and 6, I mount the fiber part or body of the disk loosely on the shaft 43. Also mounted on the shaft at each disk is a hub 46 fixed to said shaft by a set screw or pin 47. One of the side faces of the disk is provided with an annular chamber or recess 48, into which the hub 46 extends. Located in said recess and secured to said hub is a collar 49 provided with a plurality of ratchet teeth, which are engaged by a spring-pressed pawl 50, the latter being pivotally secured to an annular plate 51, which extends over the open side of said recess and is secured to said disk by a plurality of fasteing screws 52, 52. By the construction described, the disk 45 may be adjusted about the shaft 43 for the purposes stated. Secured to said plate 51 and projecting laterally outward therefrom is a trip-pin 53 adapted in the rotation of the disk by the shaft 43 to be brought into contact with the lower end of the outer arm 38 and swing the inner arm 37 out of locking engagement with the basket 22, said trigger 34 of course being swung on the pivot pin 35 during such operation. The shaft 43 rotates the disk 45 in the direction of the arrow shown in Fig. 4, and carries the trip-pin 53 of said disk into contact with and past the lower end of the outer arm 38.

Each disk 45 is made thick enough laterally to provide therefor a circumferential face wide enough to have applied thereto a plurality of numerals 54, as shown in Fig. 1. The numerals on each disk 45 number from "0" to "9" and are spaced circumferentially apart equal distances. The diameter of the disk 45 shown and the speed of rotation of the shaft 43 are such that the disk is given a complete revolution once in every ten minutes, and the trip-pin 53 is arranged so as to be directly opposite the zero. The numerals are spaced a minute apart, and when the disk is turned manually so that its numeral "1" comes below the pointer or indicator 55, it will require a full one minute of time for the trip-pin 53 of such disk to be moved into contact with the and past the lower or free end of the outer arm 38 of the associated trigger 34. Should the disk be rotated manually around the shaft until the numeral "2" or "3" or "4" or any of the other numerals on the disk come below the pointer 55, it will take that many minutes before the trip-pin 53 moves into contact with the free or outer end of the trigger and swing the inner end thereof out of locking engagement with the basket 22. Consequently, an order of eggs placed in the basket may be cooked for any period of time up to the maximum limit provided on the disk 45, and as soon as such period of time has expired the basket will automatically be raised out of the boiling water in the tank. By having three baskets 22, three separate orders of eggs may be cooked at one time, and by having a trigger and disk for each basket, the order of eggs in any particular basket may be cooked for a longer or shorter or for the same period of time as the orders in the other baskets. Manifestly, one basket may be set for cooking the eggs therein three minutes, another basket set for three and one-half minutes, and the remaining basket set for four minutes or for any period of time desired. Each basket will be raised independently of the others when the time set for each basket has expired.

Figure 2:
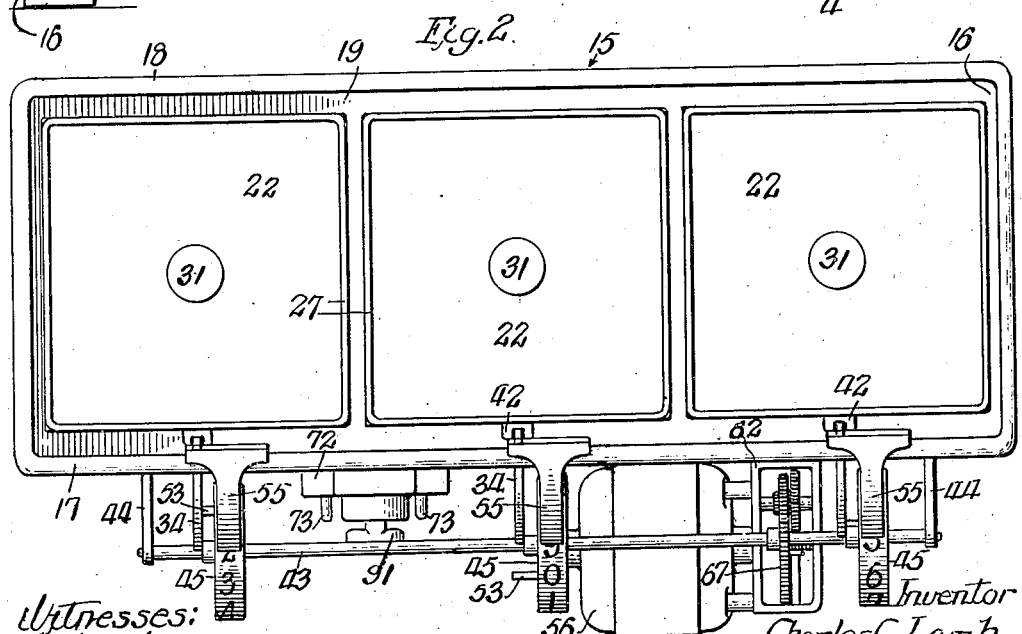
Fig. 2 is a top plan view of said device.

For rotating the shaft 43 at a uniform rate of speed, I provide a prime-mover, which in the instance shown is in the form of an electric motor 56 mounted on the front wall 17 below the shaft 43, as shown in Figs. 1, 2, and 8. Said motor 56 is so arranged that its armature shaft 57 is horizontally disposed and has one end thereof projecting beyond the motor casing. To such end of said armature shaft is secured a worm gear 58 meshing with a worm wheel 59 vertically arranged above the worm gear 58 and mounted on a shaft 60. The latter is arranged at right-angles to the armature shaft, and is horizontally disposed with its ends journaled in brackets 61, 61 connected with a supporting frame 62 secured to the casing of the motor 56. Secured to one end of said shaft 60 is a gear pinion 63 meshing with a gear wheel 64 mounted on a shaft 65 journaled in said supporting frame and arranged at right-angles to said shaft 60 and above the same. Secured to said shaft 65 is a spur gear pinion 66 meshing with a gear wheel 67 on the shaft 43. By reason of the train of gearing thus described, the motor 56 drives the shaft 43, and the gear wheels mentioned are made in such a ratio to each other and the shafts that the motor turns the shaft 43 at the rate of speed required for the disks 45. To protect the motor 56 and its train of gearing from injury and from becoming wet by having water splashed thereon, I cover such parts by a suitable casing 68, as shown in dotted lines in Fig. 1. Said motor 56 is secured to the tank wall 17 by fastening members 69 inserted into said tank wall and base flanges 70 on said motor casing. To allow for an air space between the motor casing and the tank wall 17, I interpose spacing washers 71 between such parts. By this construction the transfer of heat from the tank wall 17 to the motor casing and associated parts is reduced as far as possible. Secured to the front wall 17 is a block 72 made of fiber or other non-conducting material. Said block is provided with two contact plugs 73, which project outward beyond the tank wall 17. As shown in Fig. 3, the inner ends of said plugs 73 project inward beyond the front wall 17 below the bottom wall 19 and are screw-threaded to receive clamp nuts 74 adapted to receive the ends of electric wires 75. Secured to the under side of the bottom wall 19 of the tank and adjacent the front wall 17 is a fiber or like block or plate 76 having secured thereto and depending therefrom a contact plate 77. One wire 75 connects one contact plug 73 with said contact plate, and the other wire 75 connects the other contact plug 73 with one of the terminals of the motor 56. A wire 78 connects the other terminal of the motor 56 with a movable contact member 79, which when moved into contact with the contact plate 77 serves to complete the circuit between the plugs 73 and the motor 56. When said plugs 73 are connected with a source of current supply, such as with a lamp or wall socket and the movable contact member 79 is engaged with the plate 77, the motor 56 is set in operation and the shaft 43 rotated. When said movable contact member 79 is moved away from the plate 77, the current is cut off and the motor 56 stopped and no power transmitted to the shaft 43.

For moving the movable contact member 79 into and out of contact with said contact plate 77, I provide the following construction. Located beneath the bottom wall 19 is a shaft 80 extending between the end walls 16, 16 and having its ends journaled in said walls. Said shaft 80 is thereby rockably mounted between said end walls 16. Secured to said rock-shaft 80 are a plurality of arms 81, 81, three in number, or one for each basket 22. The free or swinging end of each arm 81 is below one of the holes 30 in the bottom wall 19, so as to be engaged by the lower end of the rod 33 when moved downward through said hole. The movable contact member 79, as shown in Fig. 9, is in the form of a knife switch, and is secured to an insulating block 82, which in turn is mounted on the end of an arm 83 secured to said rock-shaft 80. Said arm 83 is provided below said block with a weighted member 84, so that the arm 83 and its contact member 79 will be maintained by gravity out of contact with the contact plates 77 when all of the baskets 22 are held out of the water in the tank. Said weight 84 also serves to hold the arms 81 up against the bottom wall of the tank at such time, so that the free ends of said arms 81 will always be in position to be engaged by the rods 33 when moved downward thereagainst in depressing the baskets. From the foregoing it is clear that when any basket 22 is depressed to its fullest extent in the tank, the rod 33 of such basket will move the arm 81 downward, thereby rock the shaft 80 and raise the arm 83 so as to bring its contact member 79 into contact with the contact plate 77 and thereby supply current to the motor to operate the same and the shaft 43. Such contact members remain in engagement until the period of time previously set for cooking the eggs in the depressed basket has expired, whereupon the trigger 34 for such basket is moved by the trip-pin 53 out of locking engagement with the depressed basket, permitting the same to be raised out of the water in the tank by its spring 32. When this happens, the rod 33 of such basket is raised out of engagement with the associated arm 81, thereby allowing the weight 84 to drop and disengage the contact members 77, 79, and thereby cut off the current to the motor. The motor 56 will operate as long as any one basket remains depressed in the tank, but will be stopped when all the baskets are up, thereby requiring the use of current for driving the motor only when the baskets are in use for boiling eggs. From this it follows that there is a saving in current for operating the motor, as the same is operated only when the eggs are being cooked.

Any form of means may be employed for heating the water in the tank 15 and maintaining such water at a boiling point as long as the egg boiler is in actual use. In the drawings, however, I have shown electrical means for heating the water. For this purpose I provide a suitable hole 85 in the bottom wall 19 and extend therethrough a tubular casing 86 forming a well. The upper end of said casing is turned outward to provide a flange 87, which rests on the upper surface of the bottom wall 19. Said casing 86 is secured to said bottom wall 19 so as to provide a water-tight joint between such parts. Located within said casing is a heating coil 88, which has its lower end extending below said casing and is there provided with two terminals or poles 89 for the reception of wires or conductors 90. A water-tight joint is formed between the part of the coil 88 extending through the bottom of the casing 86. As shown in Fig. 3, I have provided two heating coils 88, both being made as shown in Fig. 10. Said heating coils 88 are arranged on opposite sides of the center basket 22, so as to gain the best distribution of heat for the body of water in the tank. As shown in said Fig. 3, the wires 90 are so arranged as to connect the heating coils with the contact plugs 73, so that when said plugs are connected with a source of current supply, current will be supplied to said coils for heating the water in the tank 15. I may provide in the block 72 a snap switch 91 so arranged and constructed that the current to the heating coils and the motor 56 may be cut off without disconnecting the plugs 73 from the lamp or wall socket.

The purpose of providing a combination spring and float for each basket will now be explained. The spring 32 serves to raise the basket and contained eggs out of and above the level of the water in the tank. The spring has sufficient force to lift such weight and maintain the same at all times above the level of the water in the tank. The float for each basket 22 has just enough lifting power to float the basket alone on the water in the tank. When using my novel egg boiler in the kitchen of a dining car, the latter when in motion is usually vibrated sufficiently to cause the water in the tank to be agitated, and if the tank is open and low enough will cause the water to splash out of the tank. When all of the baskets are up, that is, raised, and not in use, the floats of the baskets substantially cover the surface of the water, and, should the latter be vibrated by the motion of the car, the water will rise against the under side of the floats and the latter be raised up and down therewith to prevent breaking up of the surface of the water and thus prevent splashing.

In general statements, my device is operated as follows. Current is supplied to the heating elements 88 for heating the water in the tank and maintaining such water just below or at the boiling point during the use of the device. When all of the baskets 22 are up, the motor 56 is inoperative. A waiter or operator places an order of eggs in one of the baskets, then sets the disk 45. Said basket is then depressed into the water in the tank by pressing downward on the knob of such basket. The trigger for said basket automatically engages the depressed basket and holds the same submerged in the boiling water in the tank until the period of time set for boiling the eggs in such basket has expired. When the basket is depressed the motor 56 is set in operation. When the time set for cooking such eggs has expired, the trigger 34 for such basket is operated by its associated trip-pin 53, whereupon the basket is raised out of the boiling water in the tank and the motor 56 stopped, if no other baskets are down in the tank. When all of the baskets are held down in the tank, the motor 56 continues to run until the last basket is raised.

By locating the heating elements 88 in the wells, which extend below the bottom wall of the tank, the excessive heat is in the wells, and therefore I am able to gain a substantially uniform distribution of the heat throughout the body of the water in the tank and above the bottom wall thereof. In other words, by the arrangement described, I am able to maintain the body of water in the tank at a predetermined degree of temperature, as for instance just below boiling, and thereby prevent a violent agitation of the surface of the water, if the heating element was made in such a way and so located as to heat the main body of water above the boiling point. Moreover, by positioning the heating elements 88 in the wells, I need only utilize a sufficient amount of heat for each well to bring the water in the well to boiling. In other words, by locating the heating elements in the wells, it is unnecessary to heat the entire bottom wall of the tank in order to bring the body of water in the tank to a temperature sufficient for cooking the eggs. Then again, the heating element being located in the wells, the upper ends of the heating elements may terminate below the bottom of the tank and therefore have no portion of the heating element extend above the bottom wall of the tank in such a manner as to interfere with depressing the receptacle 22 close to the bottom of the tank.

It will be noted that the shaft 43, the disks 45, and the motor 56, which rotates said shaft, are all located below the upper edge of the tank and in front of one of the side walls thereof. By thus arranging said parts, the latter are all out of the steam zone above the open top of the tank and therefore prevented from being subjected to the excessive heat in said zone. Moreover, by removing the disks 45 from the steam zone, said disks remain relatively cool and do not become sufficiently heated to burn the fingers of the operator in turning said disks for the purpose of setting the trip pins carried thereby. Each well 86 has located therein an electric heating coil. To prevent the wires in said coil from direct contact with the water in the well, I cover the wires by an outer shell or hollow casing. Should the wires be submerged directly in the water in the well, a short circuit would be produced, and to prevent this I position the coils in the hollow casing referred to. In Fig. 4 it will be noted that the inner arm 37 of the trigger mechanism extends downward into the tank such a distance as to have its lower end positioned between the rim and bottom wall of the basket or egg-holding receptacle 22 when the latter is depressed to its fullest extent in the tank. The weight of the outer arm 38 is sufficient to normally throw the inner arm away from the side wall 17 of the tank, and thus be always in a position to lock with the receptacle when the latter is depressed. As shown in the drawings, the side walls of the basket above its float are open. In order to prevent the lower end of the inner arm 37 from being swung into the basket through the adjacent open side wall and thereby engage the upper wall 24 of the float when the basket is released from said arm, I provide the metal strip 41, hereinbefore referred to. Said strip is so positioned that it prevents the lower end of the inner arm from being moved into a position to contact with the bottom wall of the basket in the raising of the latter. Moreover, it will be noted that the motor 56 is not only located below the upper edge of the tank, but is also positioned intermediate the end walls 16 thereof, the purpose of this being to prevent the projection of any parts beyond the end walls of the tank and thus cause the tank to occupy a greater space endwise than its length.

Although I have shown in detail one form of egg boiler constructed in accordance with my invention, yet it is to be of course understood that the details of construction and arrangement of parts shown may be variously changed and modified without departing from the spirit and scope of my invention, and I do not wish to be restricted to the details of construction and arrangement of parts illustrated, except as pointed out in the appended claims.

I claim as my invention:

1. An egg boiler, comprising a tank, a receptacle vertically movable therein, means for raising said receptacle, a pivotally mounted trigger having two connected arms straddling one of the upright walls of said tank and having movement transverse of said tank wall, said trigger having one arm extending downward into the tank and moved by said receptacle into locking engagement therewith upon the depression of said receptacle in said tank, and the other arm extending downward on the outside of said tank, and time controlled means adapted to operate on the outer arm for moving the inner arm out of locking engagement with said receptacle.

2. An egg boiler, comprising a tank, a receptacle vertically movable therein, means for raising said receptacle, a pivotally mounted trigger having two connected arms straddling one of the upright walls of said tank and having movement transverse of said tank wall, one of the arms of said trigger extending downward into said tank and moved by said receptacle into locking engagement therewith upon the depression of said receptacle in said tank, and the other arm extending downward on the outside of said tank, a disk rotatably mounted below the upper edge of said tank and provided with a trip pin adapted to operate on the outer arm for moving the inner arm out of locking engagement with said receptacle, and time controlled means for turning said disk.

3. In an egg boiler, a plurality of vertically movable receptacles, means for raising each of said receptacles, a single shaft common to all of said receptacles, a motor for rotating said shaft, and means interposed between said shaft and each receptacle and including a trigger mechanism for holding each receptacle depressed in the tank for any number of predetermined periods of time.

4. An egg boiler, comprising a tank, a receptacle vertically movable therein, an upright tube secured to the bottom of said tank, an outer tube sliding on said upright tube and connected with said receptacle, a float forming the bottom wall of said receptacle having both tubes extending therethrough, and a coiled spring located in said inner tube and serving to effect the lifting of said receptacle.

5. An egg boiler, comprising a tank, a receptacle vertically movable therein, means for raising said receptacle, a trigger mechanism for holding said receptacle depressed and stationary in said tank, time controlled means including a motor normally set to operate and retained in a fixed position and adapted to operate on said trigger mechanism for releasing said receptacle, and means operable on the depression of said receptacle in said tank for automatically setting said motor in operation.

6. An egg boiler, comprising a tank, a receptacle vertically movable therein, means for raising said receptacle, a trigger mechanism for holding said receptacle depressed and stationary in said tank, time controlled means including a motor retained in a fixed position and adapted to operate on said trigger mechanism for releasing said receptacle, and means operable on the depression of said receptacle in said tank for automatically setting said motor in operation, and for automatically stopping said motor upon the lifting of said receptacle.

7. An egg boiler, comprising a tank, a plurality of receptacles vertically movable therein, means for raising said receptacles, a trigger mechanism adapted to hold each receptacle depressed in said tank, time controlled means including a single motor common to all of said receptacles and adapted to operate on said trigger mechanism for releasing said receptacles, and means operable upon the depression of any one of said receptacles for automatically setting said motor in operation and for automatically stopping said motor upon the lifting of all of said receptacles, said motor being maintained in operation as long as any one of said receptacles remains depressed in said tank.

8. An egg boiler, comprising a tank, a receptacle vertically movable therein, means for raising said receptacle, a trigger mechanism for holding said receptacle depressed in said tank, and time controlled means including an electric motor to operate on said trigger mechanism for releasing said receptacle, and means operable upon the depression of said receptacle in said tank for cutting in current to said motor for starting the same and for cutting off current to said motor for stopping the same upon the lifting of said receptacle 9. An egg boiler, comprising a tank, a receptacle vertically movable therein, means for raising said receptacle, a trigger adapted to engage said receptacle for holding the same depressed in said tank, means, including a motor, adapted to operate on said trigger for releasing said receptacle, a rock shaft, an arm carried by said rock shaft, a rod connected with said receptacle and adapted in the depression thereof to move said arm, a member carried by said rock shaft and adapted upon the rocking thereof by the depression of said receptacle to effect the starting of said motor, and means adapted to effect the rocking of said shaft in the opposite direction when the receptacle is raised, for stopping said motor.

10. An egg boiler, comprising a tank, a receptacle vertically movable therein, means for raising said receptacle, a trigger adapted to engage said receptacle for holding the same depressed in said tank, means, including an electric motor, adapted to operate on said trigger for releasing said receptacle, a rock shaft, an arm carried thereby, a rod connected with said receptacle and adapted in the depression thereof to move said arm in one direction, a contact member carried by said shaft and adapted in the depression of said receptacle to effect the starting of said motor, and means adapted to effect the rocking of said shaft in the opposite direction when the receptacle is raised, for stopping said motor.

11. An egg boiler, comprising a tank, a receptacle vertically movable therein, a tube secured to the bottom wall of said tank and projecting upward therefrom, a tube connected with said receptacle and sliding on said first mentioned tube, means for raising said receptacle, a trigger adapted to engage said receptacle for holding the same depressed in said tank, an electric motor located outside of said tank and operating means adapted to operate on said trigger for releasing said receptacle, a rod connected with said receptacle and extending downward through said tubes, a member adapted when moved in one direction to effect the starting of said motor and when moved in the opposite direction to effect the stopping thereof and the bottom wall of said receptacle being provided with an aperture for permitting said rod to pass therethrough in the depression of said receptacle so that said rod may move said member in one direction.

12. An egg boiler, comprising a tank, a plurality of receptacles vertically movable therein, a plurality of arms, one for each receptacle and adapted to have locking engagement with said receptacles for holding the same depressed in said tank, a shaft arranged in front of one of the upright side walls of said tank and having its ends terminating short of the same, a plurality of disks mounted on said shaft, there being one disk for each receptacle, each disk being provided with a trip member adapted to operate on the associated arm for moving the same out of locking engagement with the associated receptacle, and a single motor for rotating said shaft, said motor being located below the upper edge of the tank and positioned intermediate the end walls thereof.

In testimony that I claim the foregoing as my invention, I affix my signature in the presence of two witnesses, this 20th day of March, 1918.

CHARLES C. LAMB.

Witnesses:
 EUGENE C. WANN,
 CLARA L. PEOPLES.